United States Patent [19]

Satoh et al.

[11] Patent Number: 4,984,120

[45] Date of Patent: Jan. 8, 1991

[54] CLEANING CASSETTE FOR A VIDEO CASSETTE TAPE DECK

[75] Inventors: Takateru Satoh; Kenji Hashizume; Morimasa Sasaki; Kimio Tanaka, all of Nagano, Japan

[73] Assignee: TDK Corporation, Japan

[21] Appl. No.: 302,018

[22] Filed: Jan. 25, 1989

[30] Foreign Application Priority Data

Jan. 27, 1988 [JP] Japan ............................. 63-8101[U]
Jan. 27, 1988 [JP] Japan ............................. 63-8103[U]

[51] Int. Cl.$^5$ ............................................. G11B 5/41
[52] U.S. Cl. ............................. 360/128; 15/DIG. 12
[58] Field of Search .............. 360/128, 137; 15/210 R, 15/DIG. 12

[56] References Cited

U.S. PATENT DOCUMENTS 4,811,149  3/1989  Clausen ................................ 360/128
4,855,856  8/1989  Matsuoka ........................... 360/128

FOREIGN PATENT DOCUMENTS 3527373  2/1987  Fed. Rep. of Germany ...... 360/128

Primary Examiner—David J. Severin
Attorney, Agent, or Firm—Steinberg & Raskin

[57] ABSTRACT

A cleaning cassette capable of accomplishing a safe and positive cleaning operation while ensuring smooth and stable running of a cleaning tape. The cleaning cassette includes a tape passing mechanism arranged at a front portion of a casing for ensuring satisfactory traveling of the cleaning tape while reducing contact between the cleaning tape and a head cylinder of a cassette tape deck. The mechanism includes a pair of rollers through which the cleaning tape is passed, a support member for supporting each of the rollers at each of its respective ends such that each roller can rotate and a pair of partitions provided between insertion recesses of the casing. The support member on which the rollers are supported in a manner to be laterally spaced from each other is loosely fitted between the partitions so as to reciprocatively movable in a longitudinal direction of the casing or protrude from the casing and retract into the casing when loading and unloading of the cassette with respect to the cassette tape deck is carried out, respectively.

9 Claims, 10 Drawing Sheets

CLEANING CASSETTE FOR A VIDEO CASSETTE TAPE DECK

BACKGROUND OF THE INVENTION

1. Field of the Invention

This invention relates to a cleaning cassette for a tape operatin device such as a video cassette tape deck, and more particularly to a wet-type cleaning cassette which cassette tape deck such as that of the VHS type.

2. Description of the Prior Art

Recently, use of a tape operating device such as a video cassette tape deck has been extensively increased in both the number of times and the amount of time of use of video cassette tapes. With such an increase in use of a video cassette tape deck, concomitantly an increase has occurred in the problem wherein magnetic powder produced by operation of a video cassette tape adheres to a head of the deck and its traveling system, resulting in inconveniences such as turbulence, drop-out, irregular color and color fade-out of an image, upward shifting of a tape due to pollution of a pinch roller, and the like. In view of the foregoing, a cleaning cassette for decontaminating the head and traveling system of the deck has been developed and is commercially available. Such a conventional cleaning cassette is generally classified into a dry-type cleaning cassette which includes a cleaning tape comprising a tape base or body made of polyester and abrasive powder such as silicon coated on or contained in the tape body and a wettype cleaning cassette developed for improving performance of the dry-type cleaning cassette.

The conventional wet-type cleaning cassette is generally constructed in such a manner as shown in FIGS. 1 to 4B. More particularly, the wet-type cleaning cassette includes a cleaning tape 100 comprising a tape body formed by knitting of a suitable fiber material such as polyester or the like and a cleaning liquid such as freon-ethyl alcohol, isopropanol or the like adhered to or impregnated in the tape body and is used for cleaning a revolving head cylinder 102 of a cassette tape deck as shown in FIG. 2. However, in the conventional wet-type cleaning cassette, excessive application of the cleaning liquid to the cleaning tape 100 causes tacky contact between the head cylinder 102 and the cleaning tape 100 to lead to a so-called "sticking phenomenon" which highly increases friction between the head cylinder 102 and the cleaning tape 100, resulting in a failure in a cleaning operation of the cleaning cassette and drawing of the cassette from the deck.

In order to solve such a problem, it is proposed to decrease the contact length or area between the cleaning tape 100 and the head cylinder 102. For this purpose, as shown in FIG. 3, the cleaning cassette is provided with a drawing pin 104 for reducing contact between the tape 100 and the head cylinder 102, so that introduction of the tape into the deck is varied in such a manner that it is passed in the form of a substantially V-shape with respect to the head cylinder 102 when the cassette is loaded in the deck, resulting in decreasing a contact area or length between the head cylinder 102 and the cleaning tape 100 to reduce the sticking phenomenon.

Unfortunately, such an approach causes both sides of the head cylinder 102 to be pressedly contacted with the cleaning tape 100 irrespective of decreasing the contact area therebetween, as shown in FIG. 3, resulting in an increase in friction therebetween This is enhanced depending on the cleaning liquid used. Also, the approach has another disadvantage of leading to an increase in load to the head cylinder to a degree sufficient to render use of the cleaning cassette for a cassette deck which exhibits driving force of a low level substantially impossible.

In addition, use of the drawing pin 104 causes the cassette to fail in accommodating to pushing of the cleaning tape by the deck, resulting in an increase in frictional resistance occurring during traveling or running of the cleaning tape during a cleaning operation. Thus, the cleaning tape fails to uniformly carry out a cleaning operation. Also, this causes overloading in a tape deck of which driving force is low, thereby leading to damage of the deck, so that reliability of the cleaning cassette in the operation deteriorates. Further, this causes a further disadvantage of not only rendering assembling of the cleaning cassette very difficult because mounting of a tape-contact reducing device including the drawing pin 104 on a casing 108 of the cleaning cassette is highly troublesome but complicating the structure of the cassette.

Furthermore, in general, the video cassette tape deck is adapted to carry out recording and/or reproducing according to a helical scan system using a revolving head, so that it is required to obliquely arrange the head cylinder 102 as shown in FIGS. 4A and 4B. Accordingly, in the conventional cleaning cassette in which the cleaning tape 100 is passed in the form of a V-shape in the deck, it is required to obliquely arrange the drawing pin 104 together with tilting pins 106. However, such an approach is not necessarily applied to all kinds of video cassette tape decks because the angle of inclination of the head cylinder 102 is varied depending on a type of the video tape deck. More particularly, this causes damage of an edge of the cleaning tape 100 represented by fraying of the edge depending on the video tape deck. It was found that the damage mainly results from non-uniform application of tension to the cleaning tape 100 due to a difference between the inclination angle of the head cylinder 102 and the angle of arrangement of the drawing pin 104. An increase in a difference between both angles leads to upward shifting of the cleaning tape, resulting in the tape being often entangled.

Reference numerals 110 and 112 designate a feed reel and a take-up reel, respectively.

Accordingly, it would be highly desirable to develop a cleaning cassette which is capable of accomplishing a stable and smooth cleaning operation while preventing damage of a cleaning tape.

SUMMARY OF THE INVENTION

Generally speaking, in accordance with the present invention, a cleaning cassette is provided. The cleaning cassette includes a feed reel and a take-up reel on which a cleaning tape is wound in a manner to be stretched therebetween. The feed reel and take-up reel are rotatably received in a casing, which is provided at a front portion thereof with insertion recesses for permitting access of tape loading members of a tape operating device such as a video cassette tape deck to a cleaning tape. The cleaning cassette also includes a tape passing mechanism arranged between the insertion recesses for effecting safe and stable running of the cleaning tape while reducing contact between the cleaning tape and a head cylinder of the tape operating device. The tape passing mechanism comprises a pair of rollers through which the cleaning tape is passed and a support member for rotatably supporting the rollers thereon. The rollers are raisedly arranged in a manner to be laterally or transversely spaced from each other along a front surface of the casing and reciprocatively movable in a longitudinal direction of the casing.

Such construction of the present invention permits a safe and positive cleaning operation to be effectively accomplished while ensuring safe and positive traveling or running of a cleaning tape. Also, it exhibits another advantage of substantially reducing contact between the cleaning tape and a head cylinder of the tape operating device to minimize adhesion or sticking of the cleaning tape to the head, because one-place contact of highly decreased contact area and/or length is accomplished therebetween.

In a preferred embodiment of the present invention, the rollers are movable in the longitudinal direction through the support member.

The tape passing mechanism may further comprise a pair of partitions arranged between the insertion recesses in a manner to be spaced from each other to define an interval sufficient to cause the support member to be loosely fitted between the partitions so as to be reciprocatively movable in the longitudinal direction. The reciprocative movement of the support member is carried out in a manner such that it gets out of or protrudes from the casing and retracts into the casing when the cleaning cassette is loaded in the tape operating device and drawn out from the device, respectively.

Such construction of the tape passing mechanism ensures more satisfactory traveling of the cleaning tape and facilitates incorporation of the tape passing mechanism into the cleaning cassette.

The tape passing mechanism may be so constructed that the rollers are vertically obliquely arranged in the form of a bottom-opened V-shape.

In a preferred embodiment of the present invention, the support member is formed into a substantially sideways U-shape so as to have a vertical section and upper and lower horizontal sections laterally extending from upper and lower ends of the vertical section, and the rollers are supported between the horizontal sections of the support member.

In a preferred embodiment of the present invention, one of the rollers is obliquely arranged at an inclination angle between about 80° and about 85° based on a horizontal plane and the other of the rollers is obliquely arranged at an inclination angle between about 100° and about 105° based on the horizontal plane.

Such construction of the tape passing mechanism causes a contact area between the cleaning tape and the head cylinder to be further decreased to substantially prevent adhesion or sticking of the cleaning tape to the head cylinder, resulting in further ensuring smooth and safe running of the tape, as well as effectively prevents upward shifting of the cleaning tape to eliminate damage of the tape during its running.

Accordingly, it is an object of the present invention to provide a cleaning cassette which is capable of effectively accomplishing a safe and positive cleaning operation while reducing a contact area between a cleaning tape and a head cylinder of a tape operating device.

It is another object of the present invention to provide a cleaning cassette which is capable of ensuring safe and positive traveling of a cleaning tape during its cleaning operation.

It is a further object of the present invention to provide a cleaning cassette which is capable of permitting tape-contact reducing means to get out of a casing and retract into the casing corresponding to loading and unloading of the cassette with respect to a tape operating device, respectively, resulting in safe and smooth running of a cleaning tape.

It is still another object of the present invention to provide a cleaning cassette which is capable of being reciprocatively moving a tape passing mechanism in a longitudinal direction of the cassette depending on loading and unloading of the cassette with respect to a tape operating device.

It is yet another object of the present invention to provide a cleaning cassette which is capable of facilitating its assembling.

It is even another object of the present invention to provide a cleaning cassette which is capable of readily accomplishing incorporation of a tape passing mechanism in the cassette.

It is still a further object of the present invention to provide a cleaning cassette which is capable of being positively operated without any trouble while ensuring satisfactory drawing-out and traveling of a cleaning tape.

It is yet a further object of the present invention to provide a cleaning cassette which is capable of effectively preventing damage of a cleaning tape such as entangling of its edge or the like during its running.

It is even a further object of the present invention to provide a cleaning cassette which is capable of accomplishing one-place contact between a cleaning tape and a head cylinder of a tape operating device to significantly reduce a contact area or length therebetween.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings; wherein.

DETAILED DESCRIPTION OF THE PREFERRED EMBODIMENT

Figure 1:
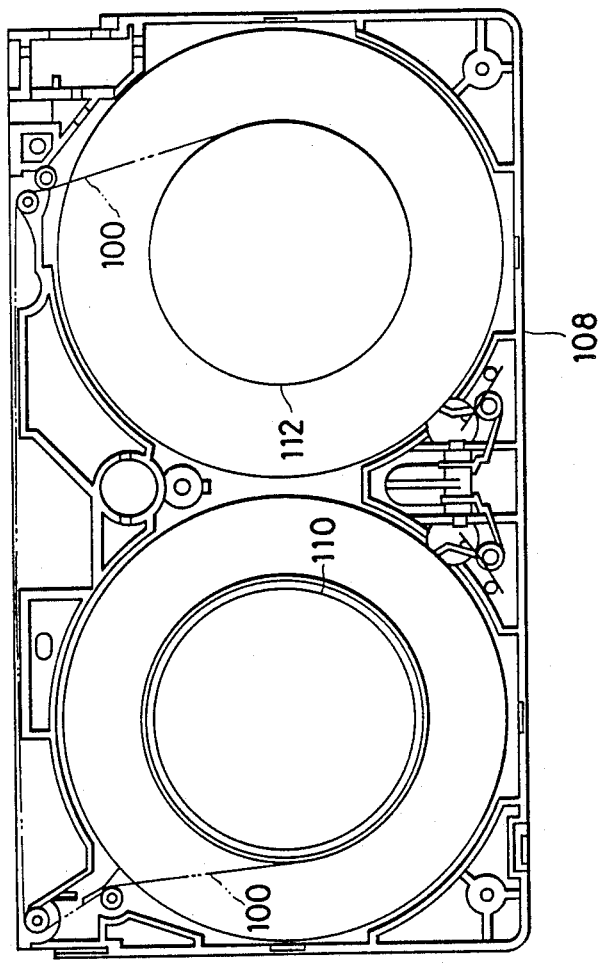
FIG. 1 is a plan view showing a conventional cleaning cassette.
Figure 2:
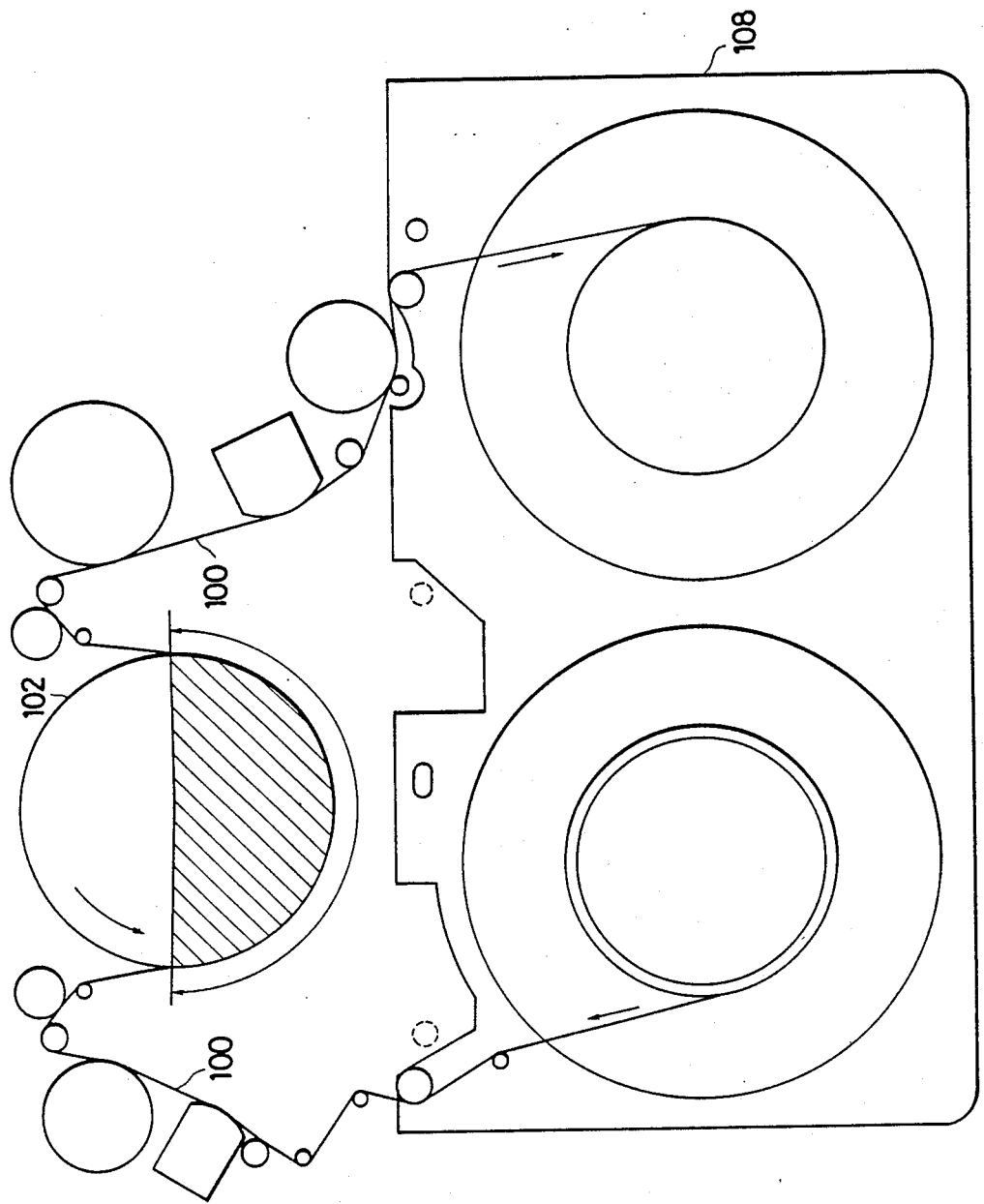
FIGS. 2 and 3 each are a plan view showing a manner of use of a conventional cleaning cassette.
Figure 3:
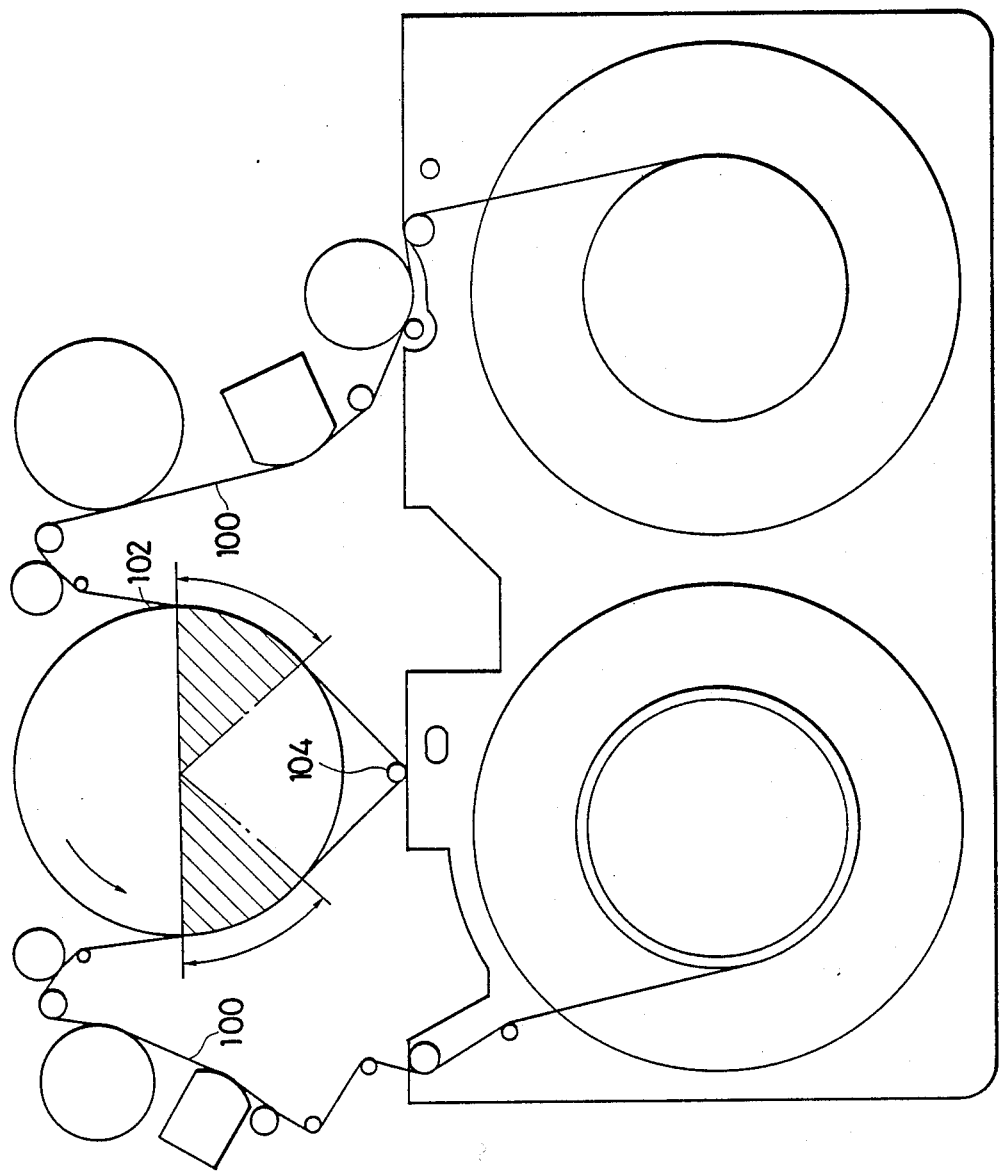

Now, a cleaning cassette according to the present invention will be described hereinafter with reference to FIGS. 5 to 12, wherein like reference numerals designate like or corresponding parts throughout.

FIGS. 5 to 12 show an embodiment of a cleaning cassette according to the present invention.

Figure 6:
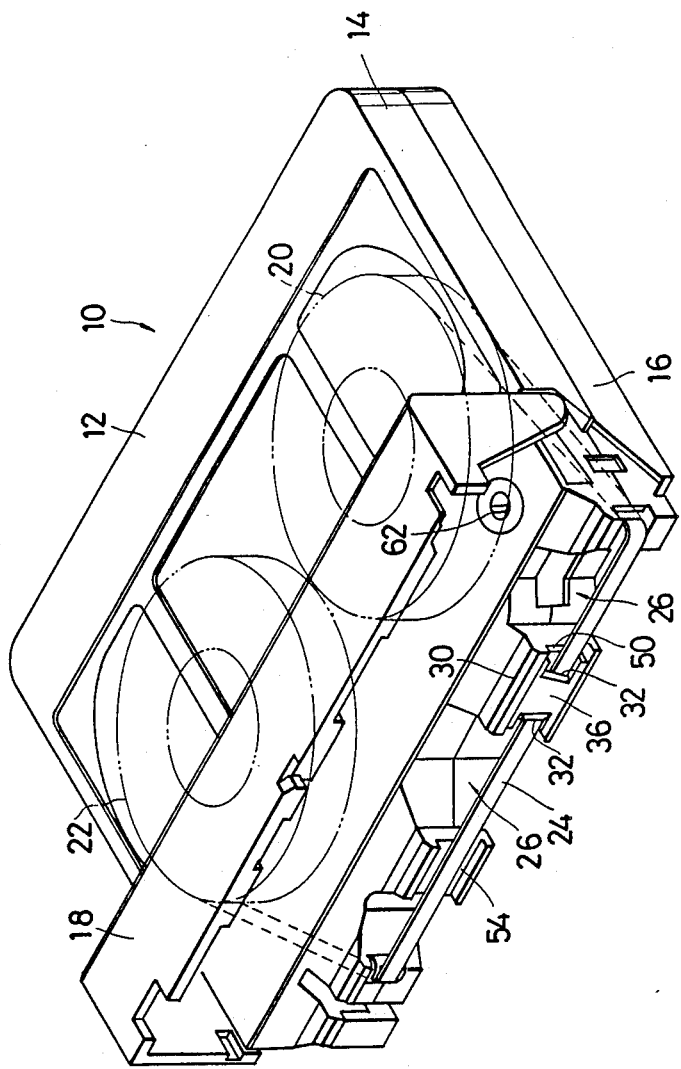
FIG. 6 is a perspective view of the cleaning cassette shown in FIG. 5 wherein a front cover is open.
Figure 7:
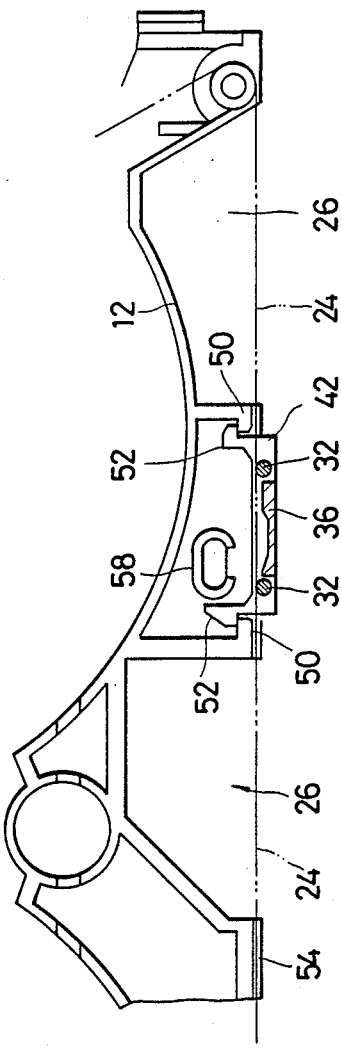
FIG. 7 is a fragmentary plan view partly in section showing an essential part of the cleaning cassette shown in FIG. 5.
Figure 8:
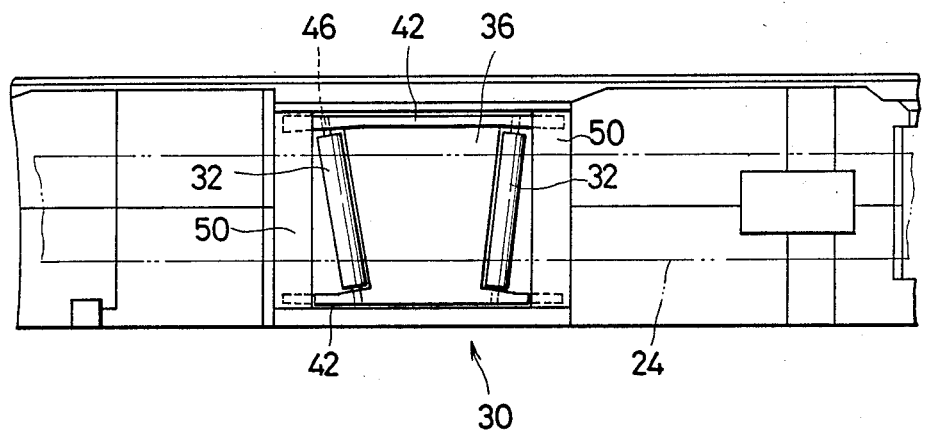
FIG. 8 is a fragmentary front elevation view showing an operation of the essential part of the cleaning cassette shown in FIG. 7
Figure 9:
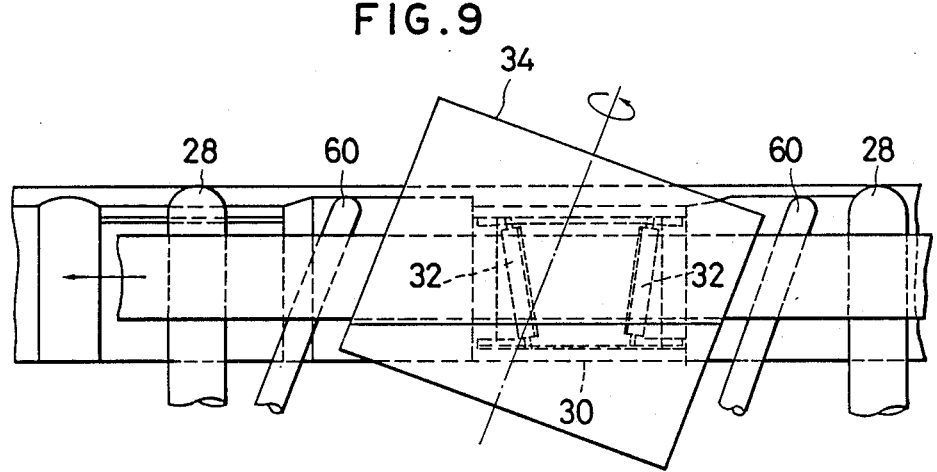
FIG. 9 is a fragmentary enlarged front elevation view showing an operational relationship between the essential part of the cleaning cassette shown in FIG. 7 and a revolving head cylinder of a tape operating device.
Figure 12:
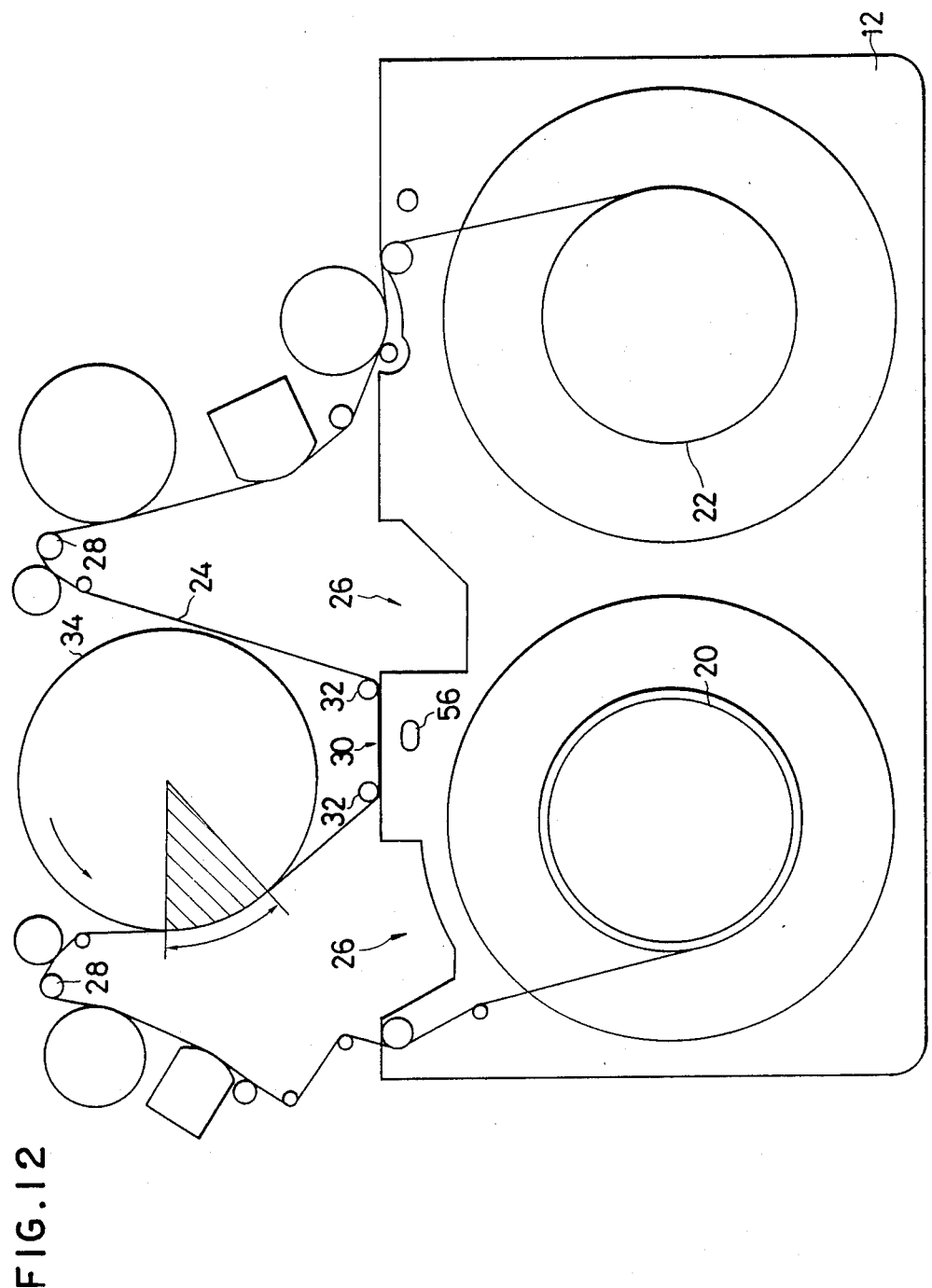
FIG. 12 is a schematic plan view showing a manner of operation of a cleaning tape of the present invention in a tape operating device.

A cleaning cassette of the illustrated embodiment is generally designated at reference numeral 10 and includes a casing 12 comprising an upper casing member 14 and a lower casing member 16 joined together so as to define a space therein. The casing 12 is formed at a front end thereof with an opening, which is selectively closed with a front cover 18 pivotally mounted on the front end of the casing 12, as shown in FIG. 6. The front cover 18 may be mounted on the casing 12 in such a manner as widely known in the art so as to be opened and closed when the cleaning cassette is loaded in a tape operating device and drawn out from the device, respectively. In the casing 12 are rotatably received a feed reel 20 and a take-up reel 22, on which a cleaning tape 24 is wound in a manner to be stretched therebetween. The casing 12 is provided on a front side or portion thereof with a pair of insertion recesses 26 for permitting access of tape loading members 28 of a tape operating device such as a video cassette tape deck to the cleaning tape 24 therethrough in order to introduce the cleaning tape in the tape operating device for cleaning when the cleaning cassette is loaded in the video cassette tape deck as shown in FIG. 12.

The cleaning cassette 10 of the illustrated embodiment also includes a tape passing mechanism 30 which is constructed so as to effect smooth and positive running or traveling of the cleaning tape 24 while reducing the contact area and/or length between the cleaning tape 24 and a revolving head cylinder 34 of the tape operating device during a cleaning operation, to thereby render the operation safe and stable. The tape passing mechanism 30 includes tape-contact reducing means 32 for passing the cleaning tape therethrough in a manner to decrease contact of the cleaning tape 24 with the head cylinder 34 of the cassette tape deck, which is arranged at a portion of the casing interposed between the insertion recesses 26. In the illustrated embodiment, the tape-contact reducing means 32 comprises a pair of rollers which are arranged along a front surface of the casing 12 and in a manner to be spaced from each other in a lateral or transverse direction of the casing 12.

Figure 10:
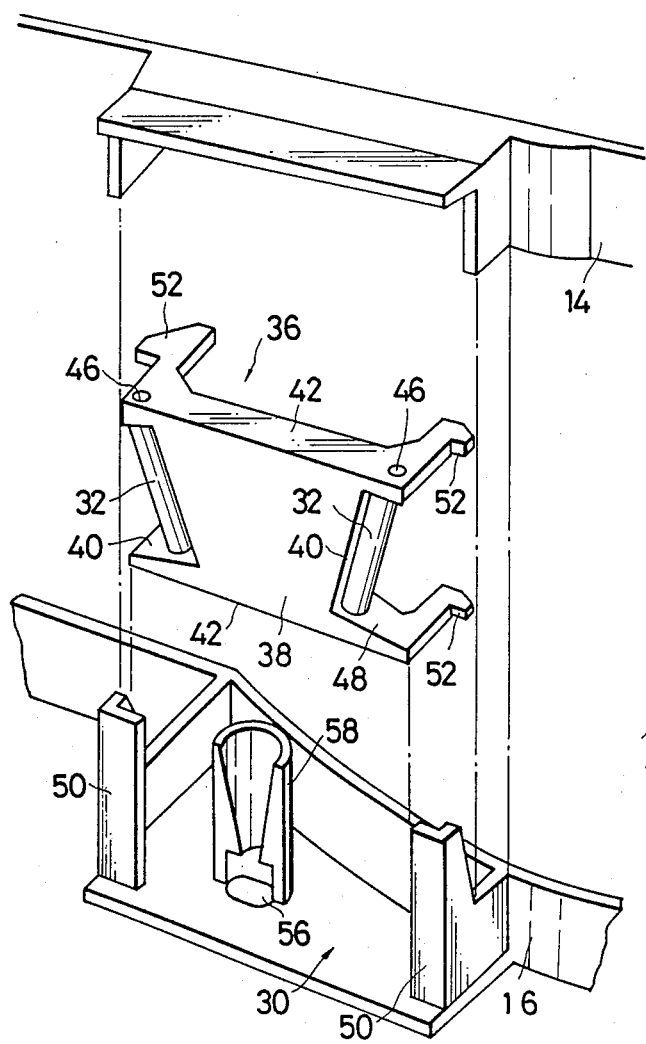
FIG. 10 is an exploded perspective view showing a tape passing mechanism in a cleaning cassette of the present invention.

The tape passing mechanism 30 also includes support means 36 for rotatably and raisingly supporting the tape contact reducing means or rollers 32. In the illustrated embodiment, the support means 36 comprises a support member formed into a substantially sideways U-shape, as shown in FIG. 10. More particularly, the support member 36 includes a vertical section which comprises a vertically extending plate body 38 formed on each of both sides thereof with a recess or cutout 40 for receiving each of the rollers 32 therein. The rollers 32 and plate body 38 each may be preferably formed into a height larger than a width of the cleaning tape 24 to ensure safe and smooth passing of the cleaning tape 24 through the tape passing mechanism 30. The support member 36 also includes upper and lower horizontal sections laterally extending from upper and lower ends of the vertical section 38, which comprise a pair of support plates 42 mounted on upper and lower ends of the plate body 38 so as to horizontally extend in the same direction therefrom and in parallel to each other. In the illustrated embodiment, the support member 36 is integrally formed. The support plates 42 serve to support the rollers 32 therebetween such that the rollers can each rotate and is each supported at its respective ends in such a manner as to be spaced from each other adjacent a front surface of the casing.

Figure 11:
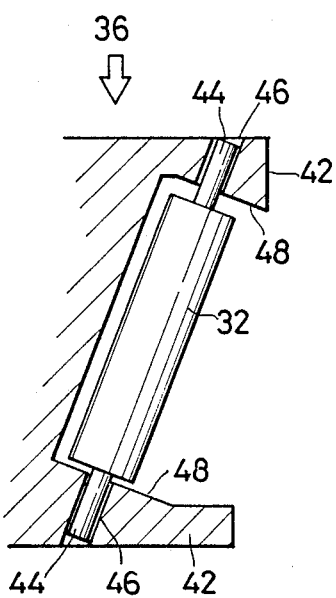
FIG. 11 is a fragmentary vertical sectional view showing a roller.

The rollers 32 each are made of a lubricous resin material such as polyacetal and is formed at both end surfaces thereof with pins 44 outwardly extending therefrom as shown in FIG. 11, which are rotatably fitted in holes 46 formed at both ends of the support plates 42, resulting in the rollers 32 being raisedly and rotatably supported in the support member 36 of a sideways U-shape. The rollers 32 each may be so formed that a distance between the upper end surface and the lower end surface is slightly or somewhat smaller than a distance between the upper support plate 42 and the lower support plate 42 as shown in FIG. 11.

In the illustrated embodiment, the tape-contact reducing means or rollers 32 may be constructed in a manner to be reciprocatively movable in a longitudinal direction of the cassette 10 or casing 12 and more particularly in its forward and rearward directions respectively corresponding to loading and unloading of the cleaning cassette 10 with respect to the tape operating device. That is, the rollers 32 constituting the tape-contact reducing means are arranged so as to get out of or protrude from the casing 12 and retract into the casing 12 depending on the loading and unloading, respectively. In the illustrated embodiment, such movement of the rollers 32 is carried out together with the support member 36, because the former is supported on the latter.

For this purpose, in the illustrated embodiment, the tape passing mechanism 30 may further include partition means for movably supporting the support member 36, which comprises a pair of partitions 50 provided between the insertion recesses 26 in a manner to be spaced from each other in the lateral direction of the casing 12. The partitions 50 are arranged so as to define an interval therebetween sufficient to loosely fit the support member 36 therebetween so that it may be movable between the partitions 50 in the longitudinal direction of the cleaning cassette 10 and more particularly in its forward and rearward directions depending on loading and unloading of the cleaning cassette with respect to the tape operating device while preventing release or disengagement of the support member 36 from the partitions 50. For this purpose, the support plates 48 of the support member 36 each are provided on each of both sides thereof with holding means 52 which, in the illustrated embodiment, comprises a hook-like holding element 52 which is adapted to be engaged with a rear end surface of each of the partitions 50 to prevent disengagement of the support member 36 from the partitions 50 in the forward direction when the cleaning cassette 10 is loaded in the tape operating device.

Figure 5:
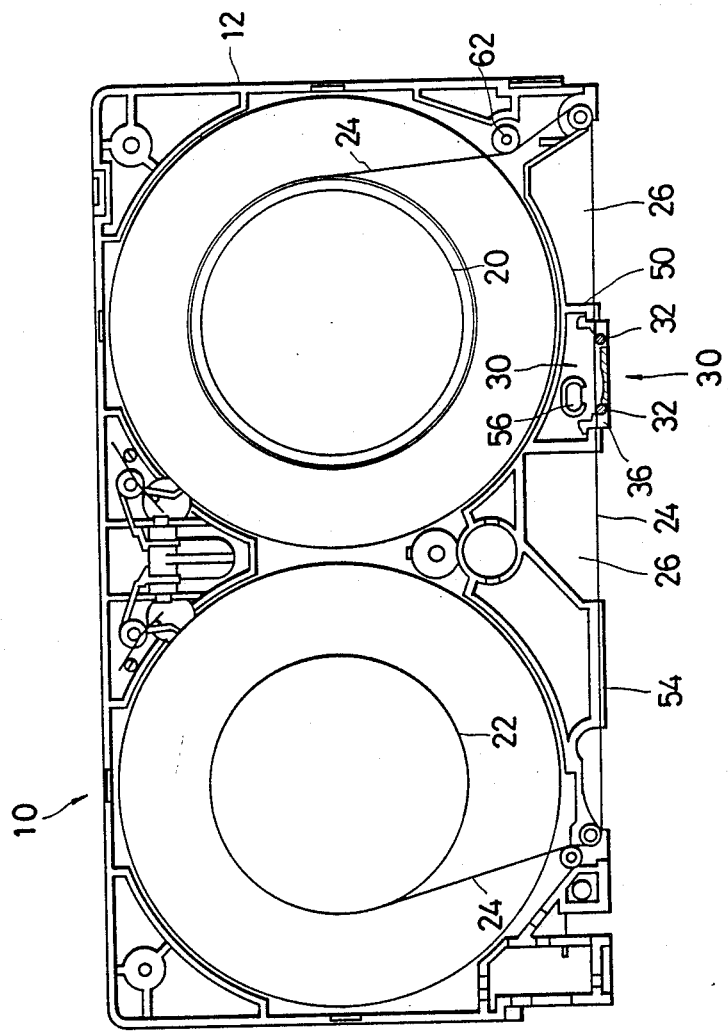
FIG. 5 is a plan view showing an embodiment of a cleaning cassette according to the present invention.

Such construction of the tape passing mechanism 30 permits the rollers 32 to forwardly protrude from the casing 12 together with the support member 36 by tension of the cleaning tape drawn out from the casing 12 by the tape loading members 28 when the cleaning cassette is loaded in the tape operating device, to thereby ensure smooth and positive traveling of the cleaning tape during the cleaning operation. At this time, disengagement of the support member 36 from the partitions 50 is effectively prevented by abutment of the holding elements 52 against the rear end surfaces of the partitions 50. FIG. 5 shows the cleaning cassette of the illustrated embodiment in an unloaded state, and FIG. 12 shows it in a state loaded in the tape operating device wherein the rollers. When the cleaning cassette 10 is unloaded from the tape operating device, the support member 36 retracts into the casing 12 together with the rollers 32. This is forcibly carried out by the front cover 18 which, as described above, may be moved to cover the front opening of the casing in a conventional manner when the cleaning cassette is drawn out from the tape operating device.

Also, the above-described construction of the tape passing mechanism 30 exhibits another advantage in permitting the support member 36 to be upwardly movable or floatable between the partitions 50 when the cleaning cassette is in an unloaded state. In the illustrated embodiment, the partitions 50 are formed on the lower casing member 16 in a manner to upwardly extend therefrom.

Further, the tape passing mechanism 30 constructed as described above permits the support member 32 in which the rollers 32 are supported to be readily incorporated in the casing 12 when the cleaning cassette 10 is assembled.

More particularly, in the tape passing mechanism 30 constructed as described above, the support member 36 through which the cleaning tape 24 is previously passed is fitted between the partitions 50 in a downward direction from the upper end of the partitions 50 while engaging the hook-like holding elements 52 with the partitions 50 and then the upper casing member 14 is joined with the lower casing member 16. The partitions 50 and support member 36 are formed and arranged so that a gap may be defined between each of the partitions 50 and the roller 32 opposite thereto. This results in lead-out and lead-in of the cleaning tape 24 through the tape passing mechanism 30 with respect to the casing 12 being carried out via the gaps defined between the rollers 32 and the partitions 50. Thus, it will be noted that the support member 36 may be readily incorporated in the casing 12 or cleaning cassette 10 and such construction ensures smooth and satisfactory running or traveling of the cleaning tape while reducing resistance in the running.

It was found that the above-described construction of the tape passing mechanism 30 not only effectively accomplishes a safe and positive cleaning operation of the cleaning cassette while ensuring safe and positive traveling or running of the cleaning tape but significantly reduces contact area and/or length between the cleaning tape 24 and the head cylinder 34 of the tape operating device to minimize adhesion or sticking of the cleaning tape to the head. This is due to the construction of the tape passing mechanism 30 such that a pair of the rollers 32 are arranged in a manner to be laterally or transversely spaced from each other to accomplish one-place contact of a reduced contact area and/or length between the cleaning tape 24 and the head cylinder 34, as shown in FIG. 12.

The tape passing mechanism may be so constructed that the rollers 32 are vertically obliquely arranged in the form of a bottom-opened V-shape. For this purpose, the rollers 32 may be arranged so that one of them is inclined at an angle between about 80° and about 85° and preferably between about 81° 30′ and about 84° based on a horizontal plane and the other roller is inclined at an angle between about 100° and about 105° and preferably between about 101° 30′ and about 104° based on the horizontal plane. Such inclined or oblique arrangement of the rollers causes the contact area and/or length between the cleaning tape 24 and the head cylinder 34 to be further reduced to substantially prevent adhesion or sticking of the cleaning tape 24 to the head cylinder 34, resulting in further ensuring smooth and safe running of the cleaning tape, as well as effectively prevents upward shifting of the cleaning tape 24 to avoid damage of the tape such as entangling of its edge or the like.

In this instance, when upper and lower surfaces of each of the rollers 32 is formed so as to be perpendicular to an axis of the pins 44, it is preferable that a support surface 48 of at least the lower support plate 42 of the support member 36 on which the lower end surface of the roller 32 may be contactedly supported is obliquely formed so as to correspond to the inclined arrangement of each roller 32, resulting in ensuring smooth rotation of the roller, as shown in FIG. 11.

Also, the above-described inclined arrangement of the rollers 32 causes inclination of the rollers to substantially approximate an inclination angle of the head cylinder 34.

Moreover, as described above, the tape passing mechanism 30 permits the support member 36 to be vertically movable between the partitions 50, resulting in smooth running of the cleaning tape when the cleaning cassette is in an unloaded state such as during a fast forward (FF) or rewind (REW) operation.

Reference numeral 54 designates a tape contact surface of the casing and 56 designates a positioning hole in which a pin is positioned. The positioning hole 56 is preferably provided at at least a part of a periphery thereof with an upwardly extending wall 58. Such arrangement of the peripheral wall 58 prevents the cleaning tape 24 from running behind the pin.

Figure 4A:
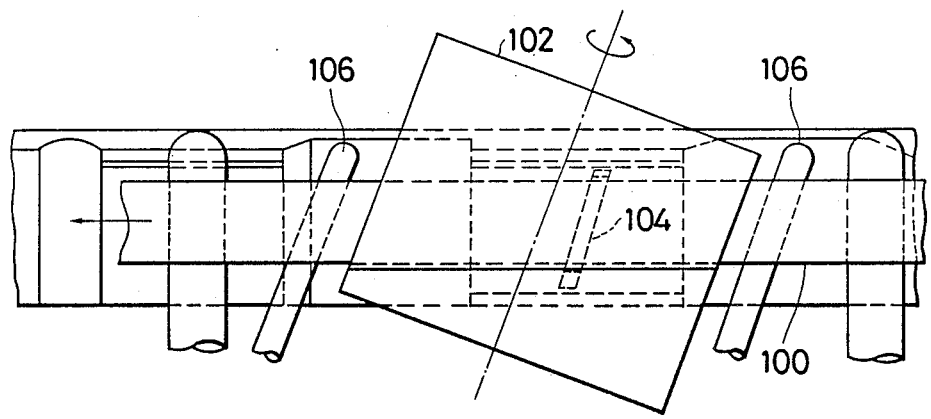
FIGS. 4A and 4B each are a fragmentary enlarged front elevation view showing an operational relationship between a revolving head cylinder of a tape operating device and an essential part of a conventional cleaning cassette.
Figure 4B:
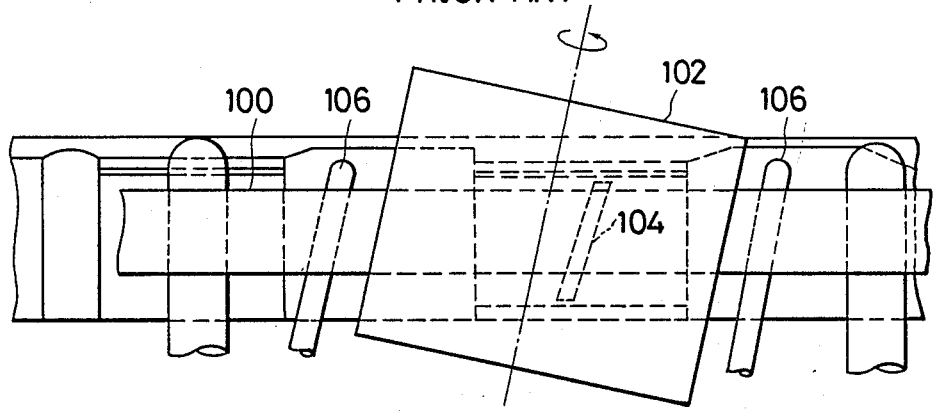

Reference numeral 60 (FIG. 9) designates tilting pins like the tilting pins 106 described above with reference to FIGS. 4A and 4B and reference numeral 62 (FIG. 5) indicates means for supplying the cleaning tape 24 with a cleaning liquid, which may be constructed so as to supply a cleaning liquid to the tape 24 by application or impregnation during running of the tape.

As can be seen from the foregoing, the cleaning cassette of the present invention includes the tape passing mechanism which is so constructed that a pair of the rollers are arranged in a manner to be laterally spaced from each other and longitudinally reciprocatively moved depending on loading and unloading of the cassette with respect to a tape operating device so as to forwardly protrude from and rearwardly retract into the casing when the cassette is loaded in and drawn out from the tape operating device, respectively. Such construction of the cleaning cassette permits the cleaning tape to be positively and smoothly traveled in safety during the cleaning operation.

Further, in the present invention, a pair of the partitions are arranged opposite to each other between a pair of the insertion recesses and the support member on which the rollers are rotatably supported is loosely fitted between the partitions, thereby facilitating incorporation of the tape passing mechanism into the cleaning cassette. Also, this results in the tape passing mechanism to be conveniently and easily arranged in a narrow space between the insertion recesses.

In addition, arrangement of the rollers in a manner to be laterally spaced from each other leads to one-place contact of a significantly reduced between the cleaning tape and a head cylinder of a tape operating device, resulting in effectively preventing adhesion of the cleaning tape to the head cylinder while ensuring smooth running of the tape and reducing loading of the deck. Also, the present invention permits an inclination angle of the cleaning tape to substantially correspond to that of the cylinder head, to thereby further reduce the contact and substantially avoid damage of the cleaning tape, its upward shifting of the tape and the like due to use of the tape-contact reducing means.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A cleaning cassette comprising:
   a feed reel and a take-up reel on which a cleaning tape is wound in a manner to be stretched therebetween;
   a casing in which said feed reel and take-up reel are rotatably received, said casing being provided at a front portion thereof with insertion recesses for permitting access of tape loading members of a tape operating device to said cleaning tape; and
   a tape passing mechanism arranged between said insertion recesses for effecting safe and stable running of said cleaning tape;
   said tape passing mechanism comprising a pair of rollers through which said cleaning tape is passed and a support member for supporting said rollers thereon such that said rollers can rotate;
   said rollers being each supported at each of its respective ends in a manner to be laterally spaced from each other adjacent a front surface of said casing and reciprocatively movable in a longitudinal direction of said casing and wherein said rollers are vertically obliquely arranged in the form of a bottom-opened V-shape.

2. A cleaning cassette as defined in any claim 1, wherein one of said rollers is obliquely arranged at an inclination angle between about 80° and about 85° based on a horizontal plane and the other of said rollers is obliquely arranged at an inclination angle between about 100° and about 105° based on said horizontal plane.

3. A cleaning cassette as defined in claim 1, wherein said support member is formed into a substantially sideways U-shape so as to have a vertical section and upper and lower horizontal sections laterally extending from upper and lower ends of said vertical section;
   said rollers being supported between said horizontal sections of said support member.

4. A cleaning cassette as defined in claim 3, wherein said tape passing mechanism further comprises holding means for preventing disengagement of said support member from said partitions.

5. A cleaning cassette as defined in claim 4, wherein said holding means comprises hook-like holding elements provided at said horizontal sections of said support member so as to be engaged with said partitions.

6. A cleaning cassette as defined in claim 3, wherein said horizontal sections of said support member are formed with support holes and said rollers each are formed at each of upper and lower end surfaces thereof with an outwardly extending pin;
   said rollers being supported between said horizontal sections through engagement of said pins of said rollers with said holes of said vertical sections.

7. A cleaning cassette as defined in claim 6, wherein said rollers each are made of a lubricous resin material.

8. A cleaning cassette as defined in claim 6, wherein said lower horizontal section of said support member has an inclined support surface;
   said rollers each being contactedly supported at said lower end surface thereof on said inclined support surface of said lower horizontal section.

9. A cleaning cassette comprising:
   a feed reel and a take-up reel on which a cleaning tape is wound in a manner to be stretched therebetween;
   a casing in which said feed reel and take-up reel are rotatably received, said casing being provided at a front portion thereof with insertion recesses for permitting access of tape loading members of a tape operating device to said cleaning tape;
   a tape passing mechanism arranged between said insertion recesses for effecting safe and stable running of said cleaning tape;
   said tape passing mechanism comprising a pair of rollers through which said cleaning tape is passed, a pair of partitions provided between said insertion recesses and a support member for supporting said rollers arranged between said partitions such that said rollers can rotate;
   said support member supporting said rollers such that they are each supported at their respective ends and laterally spaced from each other adjacent a front surface of said casing;
   said partitions being arranged in a manner to be spaced from each other in a lateral direction of said casing to define an interval sufficient to cause said support member to be loosely fitted between said partitions so as to be reciprocatively movable in a longitudinal direction of said casing;
   said support member being formed of a vertical section and upper and lower horizontal sections laterally extending from upper and lower ends of said vertical section into a substantially sideways U-shape;
   said rollers being vertically obliquely arranged in the form of a bottom-opened V-shape between said horizontal sections of said support member.

* * * * *